(12) United States Patent
Makino et al.

(10) Patent No.: US 7,660,503 B2
(45) Date of Patent: Feb. 9, 2010

(54) FLEXIBLE OPTICAL WAVEGUIDE AND OPTICAL MODULE

(75) Inventors: Tatsuya Makino, Ibaraki (JP); Atsushi Takahashi, Ibaraki (JP); Hiroshi Masuda, Ibaraki (JP); Toshihiko Takasaki, Ibaraki (JP); Tomoaki Shibata, Ibaraki (JP); Masami Ochiai, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/278,597

(22) PCT Filed: Feb. 7, 2007

(86) PCT No.: PCT/JP2007/052123

§ 371 (c)(1),
(2), (4) Date: Aug. 7, 2008

(87) PCT Pub. No.: WO2007/091596

PCT Pub. Date: Aug. 16, 2007

(65) Prior Publication Data

US 2009/0175585 A1  Jul. 9, 2009

(30) Foreign Application Priority Data

| Feb. 8, 2006 | (JP) | ............................. 2006-030884 |
| Mar. 23, 2006 | (JP) | ............................. 2006-081394 |
| Dec. 20, 2006 | (JP) | ............................. 2006-342942 |

(51) Int. Cl.
G02B 6/02 (2006.01)
G02B 6/00 (2006.01)

(52) U.S. Cl. ...................... 385/123; 385/141; 385/143; 385/145; 356/73.1

(58) Field of Classification Search ................. 385/123, 385/141, 143, 145; 356/73.1
See application file for complete search history.

(56) References Cited

U.S. PATENT DOCUMENTS

2008/0192241 A1* 8/2008 He .............................. 356/73.1
2009/0196066 A1* 8/2009 Masuda et al. .............. 362/561

FOREIGN PATENT DOCUMENTS

| JP | 2000-072876 | 3/2000 |
| JP | 3249340 | 11/2001 |
| JP | 2003-177260 | 6/2003 |
| JP | 2004-300255 | 10/2004 |
| JP | 2005-338202 | 12/2005 |
| WO | WO 2006/001447 A1 | 1/2006 |

* cited by examiner

*Primary Examiner*—Frank G Font
*Assistant Examiner*—Mary A El Shammaa
(74) *Attorney, Agent, or Firm*—Antonelli, Terry, Stout & Kraus, LLP.

(57) ABSTRACT

The present invention relates to a flexible optical waveguide including a core portion and a cladding layer which has an increment of insertion loss of 0.1 dB or less upon subjecting the waveguide to a 360° bending test at a radius of curvature of 2 mm, as well as an optical module using the flexible optical waveguide. There are provided a flexible optical waveguide having high flexing property, heat resistance and transparency, as well as an optical module using the flexible optical waveguide.

18 Claims, 2 Drawing Sheets

FLEXIBLE OPTICAL WAVEGUIDE AND OPTICAL MODULE

TECHNICAL FIELD

The present invention relates to flexible optical waveguides having excellent flexing property, heat resistance and transparency as well as optical modules.

BACKGROUND ART

In recent years, in order to comply with the requirements for high-speed large-capacity signal transmission, there have been developed signal transmission techniques using optical wiring in place of conventional electric wiring. As optical transmission lines, polymeric optical waveguides have been noticed from the standpoints of facilitated processing, low costs, high freedom of wiring and capability of high densification.

The polymeric optical waveguides are suitably in the form of a flexible optical waveguide having no hard substrate and, therefore, exhibiting a good flexibility in view of expected connection between wiring boards.

It has now been attempted to apply the flexible optical waveguides not only to the connection between wiring boards but also to various general equipments or parts such as hinged portions of foldable cellular phones and hinged portions for connecting a display and a body of note-type personal computers for which a flexible printed wiring board has been conventionally employed. For this reason, there is a demand for such flexible optical waveguides having excellent flexing property, heat resistance and transparency.

As the conventional flexible optical waveguides, there have been proposed, for example, polymeric optical waveguide films as described in Patent Document 1. The proposed polymeric optical waveguide films include a cladding layer and a core layer which are made of a deuterided or halogenated poly(meth)acrylate, and produced by a spin-coating method. As illustrated, waveguide losses of the polymeric optical waveguide films are 1.1 dB and 1.5 dB (per a wave guide length of 5 cm) as measured at a wavelength of 1.3 μm, and the waveguide loss in a non-bent state was the same as that in a bent state (refer to Examples 1 and 2 of the Patent Document 1). Although the Patent Document 1 describes merely the waveguide losses under non-bent and bent conditions as to a flexing property of the produced polymeric optical waveguide films, it fails to specify concrete measuring conditions such as a radius of curvature upon bending as well as results of repeated bending test. Therefore, the details of the conditions together with heat resistance and transparency of the obtained films are not apparent from the Patent Document 1.

As described above, there are conventionally unknown such flexible optical waveguides capable of satisfying excellent flexing property, heat resistance and transparency at the same time.

Patent Document 1: JP 3,249,340

DISCLOSURE OF THE INVENTION

The present invention has been made in view of the above conventional problems. An object of the present invention is to provide a flexible optical waveguide having high flexing property, heat resistance and transparency, as well as an optical module using the flexible optical waveguide.

As the result of extensive and intensive researches, the present inventors have found that the above problems can be solved by the following aspects of the present invention.

Thus, the present invention relates to the following aspects (1) to (17).

(1) A flexible optical waveguide including a core portion and a cladding layer, wherein an increment of insertion loss of the flexible optical waveguide upon subjecting the waveguide to a 360° bending test at a radius of curvature of 2 mm is 0.1 dB or less.

(2) The flexible optical waveguide as described in the above aspect (1), wherein a relative refractive index difference between the core portion and the cladding layer is from 1 to 10%.

(3) The flexible optical waveguide as described in the above aspect (1) or (2), wherein an increment of insertion loss of the flexible optical waveguide after subjecting the waveguide to a repeated bending test at a radius of curvature of 5 mm 100,000 times is 0.1 dB or less.

(4) The flexible optical waveguide as described in any one of the above aspects (1) to (3), wherein an elastic modulus of the flexible optical waveguide upon subjecting the waveguide to a film tensile test is from 0.05 to 6 GPa.

(5) The flexible optical waveguide as described in any one of the above aspects (1) to (4), wherein a maximum elongation of the flexible optical waveguide upon subjecting the waveguide to a film tensile test is from 3 to 50%.

(6) The flexible optical waveguide as described in any one of the above aspects (1) to (5), wherein a thickness of the flexible optical waveguide is from 9 to 500 μm.

(7) The flexible optical waveguide as described in any one of the above aspects (1) to (6), wherein an increment of transmission loss of the flexible optical waveguide after subjecting the waveguide to a reflow test at a maximum temperature of 265° C. three times is 0.05 dB/cm or less.

(8) The flexible optical waveguide as described in any one of the above aspects (1) to (7), wherein a transmission loss of the flexible optical waveguide is 0.3 dB/cm or less.

(9) The flexible optical waveguide as described in any one of the above aspects (1) to (8), wherein the core portion and/or the cladding layer are produced from a resin composition containing (A) a binder polymer, (B) a photopolymerizable compound and (C) a photopolymerization initiator.

(10) The flexible optical waveguide as described in the above aspect (9), wherein the core portion and/or the cladding layer are produced from the resin composition containing the component (A) and the component (B) in amounts of from 5 to 80% by mass and from 20 to 95% by mass, respectively, on the basis of a total amount of the components (A) and (B), and further the component (C) in an amount of from 0.1 to 10 parts by mass on the basis of 100 parts by mass of the total amount of the components (A) and (B).

(11) The flexible optical waveguide as described in the above aspect (9) or (10), wherein the binder polymer (A) is a phenoxy resin.

(12) The flexible optical waveguide as described in any one of the above aspects (9) to (11), wherein the photopolymerizable compound (B) includes a compound having an ethylenically unsaturated group in a molecule thereof.

(13) The flexible optical waveguide as described in any one of the above aspects (9) to (12), wherein the photopolymerizable compound (B) includes a monofunctional (meth)acrylate having at least one group selected from the group consisting of an aryl group, an aralkyl group, an aryloxy group and an aromatic heterocyclic group.

(14) The flexible optical waveguide as described in any one of the above aspects (9) to (12), wherein the photopolymerizable compound (B) includes an ethoxylated fluorene-type di(meth)acrylate represented by the following general formula (1):

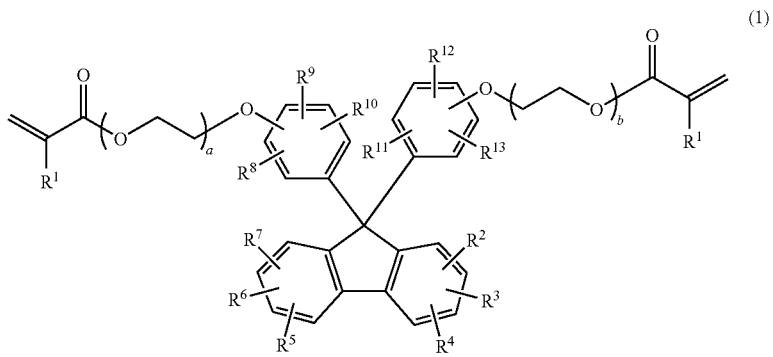

wherein $R^1$ is a hydrogen atom or a methyl group; $R^2$ to $R^{13}$ are each independently a hydrogen atom, an alkyl group having 1 to 12 carbon atoms, an alkoxy group having 1 to 6 carbon atoms, an alkoxycarbonyl group having 2 to 7 carbon atoms, an aryl group having 6 to 10 carbon atoms or an aralkyl group having 7 to 9 carbon atoms; and a and b are each independently an integer of 1 to 20.

(15) The flexible optical waveguide as described in any one of the above aspects (9) to (12), wherein the photopolymerizable compound (B) includes a (meth)acrylate represented by the following general formula (2):

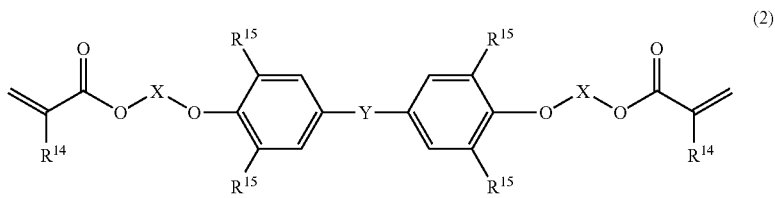

wherein X is $CH_2CH(OH)CH_2$, $(C_2H_4O)_cC_2H_4$, $(C_3H_6O)_d$ $C_3H_6$ or $(C_2H_4O)_e(C_3H_6O)_fC_3H_6$; Y is $C(CH_3)_2$, $CH_2$, $SO_2$ or O; c, d, e and f are respectively an integer of 0 to 10; $R^{14}$ is a hydrogen atom or a methyl group; and $R^{15}$ is a hydrogen atom, a methyl group or a halogen atom.

(16) The flexible optical waveguide as described in any one of the above aspects (9) to (11), wherein the photopolymerizable compound (B) includes a compound having two or more epoxy groups in a molecule thereof.

(17) An optical module using the flexible optical waveguide as described in any one of the above aspects (1) to (16).

In accordance with the present invention, there are provided a flexible optical waveguide having high flexing property, heat resistance and transparency as well as an optical module using the flexible optical waveguide.

EXPLANATION OF REFERENCE NUMERALS

1: Flexible optical waveguide (optical waveguide); 2: Core portion; 3: Upper cladding layer; 4: Lower cladding layer; 5: Cover film

BEST MODE FOR CARRYING OUT THE INVENTION

Figure 1:
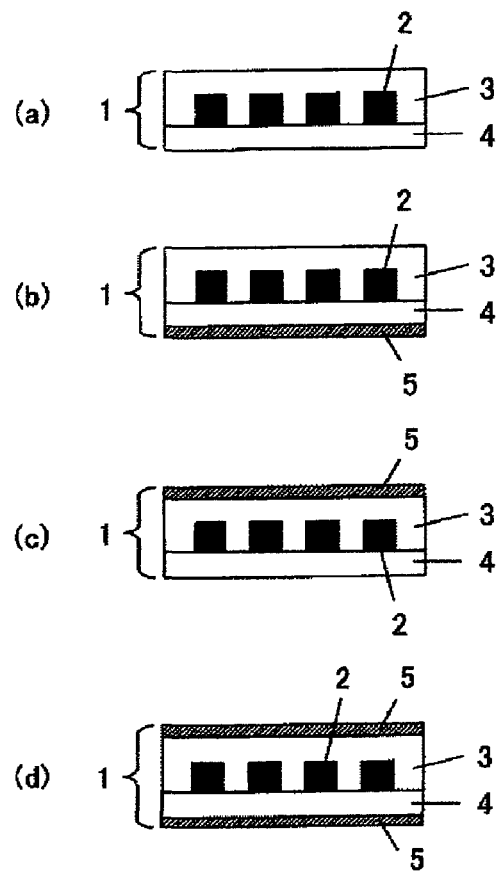
FIG. 1 is a sectional view for explaining a configuration of a flexible optical waveguide according to the present invention.

An example of the flexible optical waveguide according to the present invention is shown in FIG. 1(a). The optical waveguide 1 is constructed from a core portion 2 made of a core layer forming resin having a high refractive index, and cladding layers (upper cladding layer 3 and lower cladding layer 4) each made of a cladding layer forming resin having a low refractive index. The core portion 2 is formed by irradiating an activation light in an image-like manner onto a core layer made of the core layer forming resin through a negative mask pattern, and then developing the thus irradiated core layer to form the patterned core portion 2.

In addition, as shown in FIGS. 1(b), 1(c) and 1(d), the optical waveguide 1 may include a cover film 5 which is disposed on an outside of at least one of the upper cladding layer 3 and the lower cladding layer 4. The cover film 5 thus disposed serves for imparting a good flexibility or a high toughness to the optical waveguide 1. Further, the cover film 5 also serves for preventing the optical waveguide 1 from being stained or injured, resulting in enhancement in handling property thereof.

[Cladding Layer Forming Resin]

The cladding layer forming resin used in the present invention is not particularly limited as long as it exhibits the aimed effects of the present invention. As the cladding layer forming resin, there may be suitably used heat-curing resin compositions or light-sensitive resin compositions which have a lower refractive index than that of the core layer and are capable of being cured by exposure to light or heat. The cladding layer forming resin is more preferably composed of a resin composition containing (A) a binder polymer, (B) a photopolymerizable compound and (C) a photopolymerization initiator.

The binder polymer (A) used herein serves for forming the cladding layer and ensuring a strength and a flexibility of the cladding layer, and is not particularly limited as long as it achieves the aimed objects. Examples of the binder polymer (A) include phenoxy resins, epoxy resins, (meth)acrylic resins polycarbonates, polyarylates, polyether amides, polyether imides, polyether sulfones and derivatives of these resins. These binder polymers may be used alone or in the form of a mixture of any two or more thereof.

Among these binder polymers, from the viewpoint of a high heat resistance, preferred are those having an aromatic ring in a main chain thereof, and more preferred are phenoxy resins. Also, from the viewpoints of formation of a three-dimensional crosslinking structure and improvement in heat resistance, preferred are epoxy resins, in particular, such epoxy resins that are kept in a solid state at room temperature (25° C.). Further, in order to ensure a good transparency of a film made of the cladding layer forming resin, the compatibility of the binder polymer (A) with the photopolymerizable compound (B) as described in detail hereinunder is important. From this viewpoint, preferred binder polymers are the above phenoxy resins and (meth)acrylic resins. Meanwhile, the (meth)acrylic resins used herein mean both acrylic resins and methacrylic resins.

Among the phenoxy resins, from the viewpoint of a high heat resistance, preferred are bisphenol A-type epoxy resins in the form of a linear high-molecular weight polymer. The phenoxy resins in the form of a linear high-molecular weight polymer are generally produced by one-stage method in which bisphenol A and epichlorohydrin are subjected to polycondensation reaction, or by two-stage method in which a difunctional epoxy resin and bisphenol A are subjected to addition polymerization. Specific examples of the phenoxy resins include "PHENOTOHTO YP-50", "PHENOTOHTO YP-55" and "PHENOTOHTO YP-70" (tradenames) all available from Tohto Kasei Co., Ltd., and those phenoxy resins described in JP 4-120124A, JP 4-122714A and JP 4-339852A.

Examples of the epoxy resins kept in a solid state at room temperature (25° C.) include bisphenol A-type epoxy resins such as "EPOTOHTO YD-7020", "EPOTOHTO YD-7019" and "EPOTOHTO YD-7017" (tradenames) all available from Tohto Kasei Co., Ltd., and "EPICOAT 1010", "EPICOAT 1009" and "EPICOAT 1008" (tradenames) all available from Japan Epoxy Resins Co., Ltd.

The weight-average molecular weight of the binder polymer (A) is preferably 20,000 or more, and more preferably 50,000 or more, from the viewpoints of a high strength and a good flexibility. The upper limit of the weight-average molecular weight of the binder polymer (A) is not particularly limited, and preferably 1,000,000 or less and more preferably 500,000 or less, from the viewpoints of a good compatibility with the photopolymerizable compound (B) and a good developability upon exposure to light. Meanwhile, the weight-average molecular weight used in the present invention means the value measured by gel permeation chromatography (GPC) and expressed in terms of standard polystyrene.

The amount of the binder polymer (A) blended in the cladding layer forming resin is preferably from 5 to 80% by mass on the basis of a total amount of the components (A) and (B). When the amount of the binder polymer (A) blended is 5% by mass or more, the resultant cured resin exhibits sufficient strength and flexibility. When the amount of the binder polymer (A) blended is 80% by mass or less, the polymer is entangled with the component (B) upon exposure to light and thereby readily cured, resulting in sufficient resistance to a solvent used in the production process (hereinafter referred to merely as "solvent resistance"). From the above viewpoints, the amount of the binder polymer (A) blended is more preferably from 10 to 75% by mass and still more preferably from 20 to 70% by mass.

The photopolymerizable compound (B) is not particularly limited as long as it is polymerized upon irradiation with light such as ultraviolet rays. Examples of the photopolymerizable compound (B) include compounds having two or more epoxy groups in a molecule thereof, and compounds having an ethylenically unsaturated group in a molecule thereof.

Among these compounds, from the viewpoint of a good compatibility with the above phenoxy resins, preferred are the compounds having two or more epoxy groups in a molecule thereof. Specific examples of the compounds having two or more epoxy groups in a molecule thereof include difunctional aromatic glycidyl ethers such as bisphenol A-type epoxy resins, tetrabromobisphenol A-type epoxy resins, bisphenol F-type epoxy resins, bisphenol AF-type epoxy resins, bisphenol AD-type epoxy resins, fluorene-type epoxy resins and naphthalene-type epoxy resins; polyfunctional aromatic glycidyl ethers such as phenol novolak-type epoxy resins, cresol novolak-type epoxy resins, dicyclopentadiene/phenol-type epoxy resins and tetraphenylol ethane-type epoxy resins; difunctional aliphatic glycidyl ethers such as polyethylene glycol-type epoxy resins, polypropylene glycol-type epoxy resins, neopentyl glycol-type epoxy resins and hexanediol-type epoxy resins; polyfunctional aliphatic glycidyl ethers such as trimethylol propane-type epoxy resins, sorbitol-type epoxy resins and glycerol-type epoxy resins; difunctional alicyclic glycidyl ethers such as hydrogenated bisphenol A-type epoxy resins and hydrogenated bisphenol F-type epoxy resins; difunctional aromatic glycidyl esters such as diglycidyl phthalate; difunctional alicyclic glycidyl esters such as diglycidyl tetrahydrophthalate and diglycidyl hexahydrophthalate; difunctional aromatic glycidyl amines such as N,N-diglycidyl aniline and N,N-diglycidyl trifluoromethyl aniline; polyfunctional aromatic glycidyl amines such as N,N,N',N'-tetraglycidyl-4,4-diaminodiphenylmethane, 1,3-bis(N,N- glycidylaminomethyl)cyclohexane and N,N,O-triglycidyl-p-aminophenol; difunctional alicyclic epoxy resins such as alicyclic diepoxy acetal, alicyclic diepoxy adipate, alicyclic diepoxy carboxylate and vinyl cyclohexene dioxide; polyfunctional heterocyclic epoxy resins such as triglycidyl isocyanurate; and difunctional or polyfunctional silicon-containing epoxy resins such as organopolysiloxane-type epoxy resins. Among these compounds, from the viewpoints of a good transparency and a good heat resistance, preferred are difunctional aromatic glycidyl ethers, difunctional alicyclic glycidyl ethers and difunctional alicyclic epoxy resins.

The molecular weight of these compounds having two or more epoxy groups in a molecule thereof is usually from about 100 to about 2,000 and preferably from about 150 to about 1,000. These compounds suitably used in the present invention are usually kept in a liquid state at room temperature (25° C.).

Also, these compounds may be used alone or in combination of any two or more thereof, as well as in combination with the other photopolymerizable compounds.

Meanwhile, the molecular weight of the photopolymerizable compounds may be measured by GPC method or mass spectrometry.

Specific examples of the compounds having an ethylenically unsaturated group in a molecule thereof include (meth)acrylates, halogenated vinylidenes, vinyl ether, vinyl pyridine and vinyl phenol. Among these compounds, from the viewpoint of a good transparency and a good heat resistance, preferred are (meth)acrylates. The (meth)acrylates used in the present invention may be any of monofunctional (meth)acrylates, difunctional (meth)acrylates and tri- or more polyfunctional (meth)acrylates.

Meanwhile, the (meth)acrylates used herein mean both acrylates and methacrylates.

Examples of the monofunctional (meth)acrylates include alkyl (meth)acrylates such as methyl(meth)acrylate, ethyl (meth)acrylate, butyl (meth)acrylate, isobutyl(meth)acrylate, tert-butyl(meth)acrylate, butoxyethyl (meth)acrylate, isoamyl(meth)acrylate, hexyl(meth)acrylate, 2-ethylhexyl (meth)acrylate, heptyl(meth)acrylate, octyl(meth)acrylate, nonyl (meth)acrylate, decyl(meth)acrylate, undecyl(meth) acrylate, lauryl (meth)acrylate, tridecyl(meth)acrylate, tetradecyl(meth)acrylate, pentadecyl (meth)acrylate, hexadecyl (meth)acrylate, stearyl(meth)acrylate and behenyl (meth) acrylate; hydroxy-containing alkyl(meth)acrylates such as 2-hydroxyethyl(meth)acrylate, 2-hydroxypropyl(meth)acrylate, 3-chloro-2-hydroxypropyl(meth)acrylate and 2-hydroxybutyl(meth)acrylate; alicyclic (meth)acrylates such as cyclopentyl(meth)acrylate, cyclohexyl (meth)acrylate, 2-tetrahydrofuryl(meth)acrylate, dicyclopentanyl (meth)acrylate, dicyclopentenyl(meth)acrylate and isobornyl(meth)acrylate; alkoxy polyalkylene glycol (meth)acrylates such as methoxy polyethylene glycol (meth)acrylate, ethoxy polyethylene glycol (meth)acrylate, methoxy polypropylene glycol (meth) acrylate and ethoxy polypropylene glycol (meth)acrylate; aryloxy polyalkylene glycol (meth)acrylates such as phenoxy polyethylene glycol (meth)acrylate, nonylphenoxy polyethylene glycol (meth)acrylate and phenoxy polypropylene glycol (meth)acrylate; aralkyl group-containing (meth)acrylates such as benzyl(meth)acrylate; aryl group-containing (meth) acrylates such as phenyl(meth)acrylate, o-biphenyl (meth) acrylate, 1-naphthyl(meth)acrylate and 2-naphthyl(meth) acrylate; aryloxy group-containing (meth)acrylates such as phenoxyethyl(meth)acrylate, p-cumyl phenoxyethyl(meth) acrylate, o-phenyl phenoxyethyl(meth)acrylate, 1-naphthoxyethyl(meth)acrylate, 2-naphthoxyethyl(meth)acrylate, 2-hydroxy-3-phenoxypropyl(meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate; aromatic heterocyclic group-containing (meth)acrylates such as 2-(meth)acryloyloxyethyl-N-carbazole; and polycarboxylic acid (meth)acryloyloxyalkyl esters such as mono(2-(meth)acryloyloxyethyl)succinate, mono(2-(meth)acryloyloxyethyl) phthalate, mono(2-(meth)acryloyloxyethyl)isophthalate, mono(2-(meth)acryloyloxyethyl)terephthalate, mono(2-(meth)acryloyloxyethyl)tetrahydrophthalate, mono(2-(meth)acryloyloxyethyl)hexahydrophthalate, mono(2-(meth)acryloyloxyethyl)hexahydroisophthalate and mono(2-(meth)acryloyloxyethyl)hexahydroterephthalate. Among these monofunctional (meth)acrylates, from the viewpoints of a good transparency and a good heat resistance, preferred are benzyl(meth)acrylate, phenyl (meth)acrylate, o-biphenyl (meth)acrylate, 1-naphthayl(meth)acrylate, 2-naphthyl (meth)acrylate, phenoxyethyl(meth)acrylate, p-cumyl phenoxyethyl(meth)acrylate, o-phenyl phenoxyethyl(meth) acrylate, 1-naphthoxyethyl(meth)acrylate, 2-naphthoxyethyl (meth)acrylate, 2-(meth)acryloyloxyethyl-N-carbazole, 2-hydroxy-3-phenoxypropyl (meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate.

Examples of the difunctional (meth)acrylates include ethylene glycol di(meth)acrylate, diethylene glycol di(meth) acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated polypropylene glycol di(meth) acrylate, 1,3-butanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth) acrylate, 1,9-nonanediol di(meth)acrylate, 1,10-decanediol di(meth)acrylate, glycerol di(meth)acrylate, tricyclodecane dimethanol di(meth)acrylate, ethoxylated 2-methyl-1,3-propanediol di(meth)acrylate, ethoxylated bisphenol A di(meth) acrylate, propoxylated bisphenol A di(meth)acrylate, propoxylated and ethoxylated bisphenol A di(meth)acrylate, ethoxylated fluorene-type di(meth)acrylate; and bisphenol A-type, bisphenol F-type, bisphenol AF-type, hydrogenated bisphenol A-type and hydrogenated bisphenol F-type epoxy (meth)acrylates. Among these difunctional (meth)acrylates, from the viewpoints of a good transparency and a good heat resistance, preferred are ethoxylated bisphenol A di(meth) acrylate, propoxylated bisphenol A di(meth)acrylate, propoxylated and ethoxylated bisphenol A di(meth)acrylate, ethoxylated fluorene-type di(meth)acrylate, and bisphenol A-type, bisphenol F-type and bisphenol AF-type epoxy (meth)acrylates.

More specifically, there are preferably used the ethoxylated fluorene-type di(meth)acrylates represented by the following general formula (1), the (meth)acrylates represented by the following general formula (2), etc.

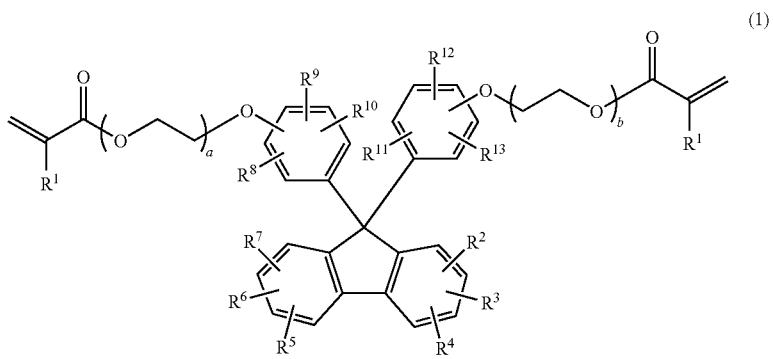

(1)

wherein $R^1$ is a hydrogen atom or a methyl group; $R^2$ to $R^{13}$ are each independently a hydrogen atom, an alkyl group having 1 to 12 carbon atoms, an alkoxy group having 1 to 6 carbon atoms, an alkoxycarbonyl group having 2 to 7 carbon atoms, an aryl group having 6 to 10 carbon atoms or an aralkyl group having 7 to 9 carbon atoms; and a and b are each independently an integer of 1 to 20. Meanwhile, the compound of the general formula (1) in which $R^1$ is a hydrogen atom; $R^2$ to $R^{13}$ are each a hydrogen atom; and a and b are each 1, is commercially available under the tradename "A-BPEF" from Shin-Nakamura Chemical Co., Ltd.

the viewpoints of a good transparency and a good heat resistance, preferred are phenol novolak-type and cresol novolak-type epoxy (meth)acrylates.

These compounds may be used alone or in combination of any two or more thereof, as well as in combination with the other photopolymerizable compounds.

The amount of the photopolymerizable compound (B) blended in the cladding layer forming resin is preferably from 20 to 90% by mass on the basis of the total amount of the components (A) and (B). When the amount of the photopolymerizable compound (B) blended is 20% by mass or more,

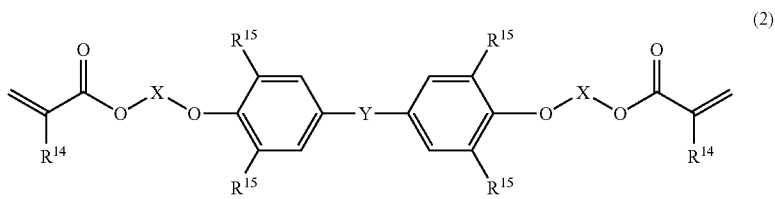

(2)

wherein X is $CH_2CH(OH)CH_2$, $(C_2H_4O)_cC_2H_4$, $(C_3H_6O)_d C_3H_6$ or $(C_2H_4O)_e(C_3H_6O)_fC_3H_6$; Y is $C(CH_3)_2$, $CH_2$, $SO_2$ or O; c, d, e and f are respectively an integer of 0 to 10; $R^{14}$ is a hydrogen atom or a methyl group; and $R^{15}$ is a hydrogen atom, a methyl group or a halogen atom. Among these compounds, preferred is the bisphenol A-type epoxy acrylate represented by the above general formula (2) in which X is $CH_2CH(OH)CH_2$; Y is $C(CH_3)_2$; and $R^{14}$ and $R^{15}$ are each a hydrogen atom, which is commercially available under the tradename "EA-1020" from Shin-Nakamura Chemical Co., Ltd.

Meanwhile, as the component (B), the above fluorene di(meth)acrylate may be used in combination with a compound having at least one (meth)acryloyl group in a molecule thereof.

Examples of the tri- or more polyfunctional (meth)acrylates include trimethylol propane tri(meth)acrylate, ethoxylated trimethylol propane tri(meth)acrylate, propoxylated trimethylol propane tri(meth)acrylate, pentaerythritol tri(meth)acrylate, pentaerythritol tetra(meth)acrylate, ethoxylated pentaerythritol tetra(meth)acrylate, propoxylated pentaerythritol tetra(meth)acrylate, dipentaerythritol hexa(meth)acrylate, ethoxylated isocyanuric acid tri(meth)acrylate, and phenol novolak-type and cresol novolak-type epoxy(meth)acrylates. Among these polyfunctional (meth)acrylates, from the binder polymer (A) is entangled therewith and readily cured, resulting in sufficient solvent resistance of the cured resin. When the amount of the photopolymerizable compound (B) blended is 95% by mass or less, the resultant cured resin exhibits sufficient strength and flexibility. From the above viewpoints, the amount of the photopolymerizable compound (B) blended is more preferably from 25 to 90% by mass and still more preferably from 30 to 80% by mass.

The photopolymerization initiator (C) is not particularly limited as long as it is a compound capable of polymerizing the photopolymerizable compound (B) by irradiation with light such as ultraviolet rays. Examples of the photopolymerization initiator (C) used in combination with the epoxy resins as the component (B) include aryl diazonium salts such as p-methoxybenzene diazonium hexafluorophosphate; diaryl iodonium salts such as diphenyl iodonium hexafluorophosphate and diphenyl iodonium hexafluoroantimonate; triaryl sulfonium salts such as triphenyl sulfonium hexafluorophosphate, triphenyl sulfonium hexafluoroantimonate, diphenyl-4-thiophenoxyphenyl sulfonium hexafluorophosphate, diphenyl-4-thiophenoxyphenyl sulfonium hexafluoroantimonate and diphenyl-4-thiophenoxyphenyl sulfonium pentafluorohydroxyantimonate; triaryl selenonium salts such as triphenyl selenonium hexafluorophosphate, triphenyl selenonium tetrafluoroborate and triphenyl selenonium hexafluoroantimonate; dialkyl phenacyl sulfonium salts such as dimethyl phenacyl sulfonium hexafluoroantimonate and diethyl phenacyl sulfonium hexafluoroantimonate; dialkyl-4-hydroxy salts such as 4-hydroxyphenyldimethyl sulfonium hexafluoroantimonate and 4-hydroxyphenylbenzylmethyl sulfonium hexafluoroantimonate; and sulfonic esters such as α-hydroxymethyl benzoin sulfonic acid ester, N-hydroxyimidosulfonate, α-sulfonyloxyketone and β-sulfonyloxyketone. Among these photopolymerization initiators, from the viewpoints of a good transparency and a good curability, preferred are triaryl sulfonium salts.

Examples of the photopolymerization initiator (C) used in combination with the compounds having an ethylenically unsaturated group in a molecule thereof as the component (B) include aromatic ketones such as benzophenone, N,N'-tetramethyl-4,4'-diaminobenzophenone, N,N'-tetraethyl-4,4'-diaminobenzophenone, 4-methoxy-4'-dimethylaminobenzophenone, 2,2-dimethoxy-1,2-diphenylethane-1-one, 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one, 2-benzyl-2-dimethylamino-1-(4-morpholinophenyl)-butane-1-one, 1,2-methyl-1-[4-(methylthio)phenyl]-2-morpholinopropane-1-one and 1-[(4-phenylthio)phenyl]-1,2-octadione-2-benzoyl oxime; quinones such as 2-ethyl anthraquinone, phenanthrene quinone, 2-tert-butyl anthraquinone, octamethyl anthraquinone, 1,2-benzanthraquinone, 2,3-benzanthraquinone, 2-phenyl anthraquinone, 2,3-diphenyl anthraquinone, 1-chloroanthraquinone, 2-methyl anthraquinone, 1,4-naphthoquinone, 9,10-phenanthraquinone, 2-methyl-1,4-naphthoquinone and 2,3-dimethyl anthraquinone; benzoin ether compounds such as benzoin methyl ether, benzoin ethyl ether and benzoin phenyl ether; benzoin compounds such as benzoin, methyl benzoin and ethyl benzoin; benzyl derivatives such as benzyl dimethyl ketal; 2,4,5-triaryl imidazole dimers such as 2-(o-chlorophenyl)-4,5-diphenyl imidazole dimer, 2-(o-chlorophenyl)-4,5-di(methoxyphenyl)imidazole dimer, 2-(o-fluorophenyl)-4,5-diphenyl imidazole dimer, 2-(o-methoxyphenyl)-4,5-diphenyl imidazole dimer and 2-(p-methoxyphenyl)-4,5-diphenyl imidazole dimer; phosphine oxides such as bis(2,4,6-trimethylbenzoyl)phenyl phosphine oxide, bis(2,6-dimethoxybenzoyl)-2,4,4-trimethylpentyl phosphine oxide and 2,4,6-trimethylbenzoyldiphenyl phosphine oxide; acridine derivatives such as 9-phenyl acridine and 1,7-bis(9,9'-acridinyl heptane); N-phenyl glycine derivatives; and cumarin-based compounds. The 2,4,5-triaryl imidazole dimers may be in the form of a symmetric compound in which substituent groups bonded to aryl groups in the triaryl imidazole moiety are identical to each other, or in the form of an asymmetric compound in which substituent groups bonded to aryl groups in the triaryl imidazole moiety are different from each other. In addition, there may also be used combination of a thioxanthone-based compound and a tertiary amine such as combination of diethyl thioxanthone and dimethylaminobenzoic acid. Among these photopolymerization initiators, in particular, from the viewpoints of a good transparency and a good curability of a thick film, preferred are α-hyroxyketones such as 1-hydroxycyclohexyl phenyl ketone and 2-hydroxy-2-methyl-1-phenylpropane-1-one, 1-[4-(2-hydroxyethoxy)phenyl]-2-hydroxy-2-methyl-1-propane-1-one, and phosphine oxides.

The above photopolymerization initiators (C) may be used alone or in combination of any two or more thereof, as well as in combination with adequate sensitizers.

The amount of the photopolymerization initiator (C) blended in the cladding layer forming resin is preferably from 0.1 to 10% by mass on the basis of 100% by mass of the total amount of the components (A) and (B). When the amount of the photopolymerization initiator (C) blended is 0.1% by mass or more, the resultant optical waveguide exhibits a sufficient light sensitivity. Whereas, when the amount of the photopolymerization initiator (C) blended is 10% by mass or less, the resultant optical waveguide is sufficiently cured without selectively curing only a surface of the optical waveguide, and further is free from increase in transmission loss owing to light absorption of the photopolymerization initiator itself. From the above viewpoints, the amount of the photopolymerization initiator (C) blended is more preferably from 0.3 to 7% by mass and still more preferably from 0.5 to 5% by mass.

The cladding layer forming resin may also contain, if required, various so-called additives such as antioxidants, yellow discoloration inhibitors, ultraviolet absorbers, visible light absorbers, colorants, plasticizers, stabilizers and fillers unless the addition thereof adversely affects the aimed effects of the present invention.

The cladding layer forming resin may be used in the form of a cladding layer forming resin varnish which is prepared by dissolving a resin composition containing the components (A) to (C) in a suitable organic solvent. The organic solvent used for preparing the resin varnish is not particularly limited as long as the solvent is capable of dissolving the resin composition forming the cladding layer forming resin therein. Examples of the organic solvent include acetone, methanol, ethanol, isopropanol, methyl ethyl ketone, methyl isobutyl ketone, cyclohexanone, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene, N,N-dimethylformamide, N,N-dimethylacetamide and N-methyl pyrrolidone. Among these organic solvents, from the viewpoints of a good dissolvability and a suitable boiling point, preferred are methyl ethyl ketone, methyl isobutyl ketone, cyclohexanone, methyl lactate, ethyl lactate, ethyl cellosolve, propylene glycol monomethyl ether acetate and N,N-dimethylacetamide.

The above organic solvents may be used alone or in combination of any two or more thereof. The content of solid components in the resin varnish is preferably from 30 to 80% by mass.

The cladding layer forming resin varnish is preferably prepared by mixing the respective components under stirring. The stirring method is not particularly limited. From the viewpoint of a good stirring efficiency, the stirring method using a propeller is preferably used. The rotating speed of the propeller used upon the stirring is not particularly limited, and is preferably from 10 to 1,000 rpm. When the rotating speed of the propeller is 10 rpm or more, the components (A) to (C) as well as the organic solvent are respectively mixed with each other to a sufficient extent. When the rotating speed of the propeller is 1,000 rpm or less, air bubbles are hardly incorporated into the resin varnish under stirring owing to rotation of the propeller. From the above viewpoints, the rotating speed of the propeller is more preferably from 50 to 800 rpm and still more preferably from 100 to 500 rpm. The stirring time is not particularly limited, and is preferably from 1 to 24 h. When the stirring time is 1 h or longer, the components (A) to (C) as well as the organic solvent are respectively mixed with each other to a sufficient extent. When the stirring time is 24 h or shorter, the time required for preparing the resin varnish is shortened.

The thus prepared cladding layer forming resin varnish is preferably subjected to filtration using a filter having a pore size of 50 μm or less. When the pore size of the filter is 50 μm or less, large foreign matters are removed from the resin varnish, thereby avoiding problems such as cissing of the resin varnish upon coating. From the above viewpoints, the filtration is more preferably carried out using a filter having a pore size of 30 μm or less and still more preferably using a filter having a pore size of 10 μm or less.

Also, the cladding layer forming resin varnish prepared above is preferably subjected to defoaming under reduced pressure. The defoaming method is not particularly limited. Specific examples of the defoaming method include those methods using combination of a vacuum pump and a bell-jar, a defoaming apparatus equipped with an evacuator, etc. The reduced pressure used upon the defoaming is not particularly limited, and is preferably such a pressure under which the organic solvent contained in the resin varnish is not boiled. The defoaming time under reduced pressure is not particularly limited, and is preferably from 3 to 60 min. When the defoaming time under reduced pressure is 3 min or longer, air bubbles dissolved in the resin varnish are fully removed. When the defoaming time under reduced pressure is 60 min or shorter, the organic solvent contained in the resin varnish is prevented from being volatilized therefrom.

In the flexible optical waveguides shown in FIGS. 1(a) to 1(d), the lower cladding layer 4 may be formed, for example, by applying the cladding layer forming resin varnish onto a substrate by a spin-coating method, etc., and then removing the organic solvent therefrom. Alternatively, the lower cladding layer 4 may be formed from a cladding layer forming resin film which is prepared by applying the cladding layer forming resin varnish onto a suitable support film and then removing the organic solvent therefrom. Further, the lower cladding layer 4 may be formed by attaching the resin film onto a substrate by a laminating method, etc.

Examples of the suitable substrate include a silicon substrate having an oxide film, and a glass substrate.

In the flexible optical waveguides shown in FIGS. 1(b) and 1(d) in which a cover film 5 is disposed outside of the lower cladding layer 4, for example, the substrate on which the cladding layer forming resin film is laminated may also function as the cover film 5. In addition, the support film used for forming the cladding layer forming resin film may also function as the cover film 5.

In the flexible optical waveguides shown in FIGS. 1(a) and 1(c) in which no cover film 5 is disposed outside of the lower cladding layer 4, the substrate or the support film used above may be peeled off from the lower cladding layer 4, for example, by a suitable method such as chemical solution treatment, after production of the optical waveguides 1.

In the flexible optical waveguides shown in FIGS. 1(a) to 1(d), the upper cladding layer 3 may be formed, for example, by using the above cladding layer forming resin varnish or the above cladding layer forming resin film after forming the below-mentioned core portion 2, in the same manner as described for forming the lower cladding layer 4.

In the flexible optical waveguides shown in FIGS. 1(c) and 1(d) in which the cover film 5 is disposed outside of the upper cladding layer 3, for example, after forming the upper cladding layer 3, the cover film 5 may be attached thereonto by a suitable method such as lamination. In addition, the support film used for forming the cladding layer forming resin film, or the substrate on which the cladding layer forming resin film is laminated may also function as the cover film 5.

In the flexible optical waveguides shown in FIGS. 1(a) and 1(b) in which no cover film 5 is disposed outside of the upper cladding layer 3, for example, after forming the upper cladding layer 3, the support film may be peeled off from the upper cladding layer 3 by a suitable method such as chemical solution treatment.

The thickness of the cladding layer (total thickness of the upper cladding layer 3 and the lower cladding layer 4) is preferably in the range of from 9 to 500 μm. When the thickness of the cladding layer is 9 μm or more, a transmitted light is readily confined within the core portion. When the thickness of the cladding layer is 500 μm or less, the optical waveguide 1 exhibits a sufficient flexibility since the whole thickness thereof is not too large. From the above viewpoints, the thickness of the cladding layer is more preferably from 10 to 300 μm, still more preferably from 20 to 200 μm and further still more preferably from 30 to 150 μm.

In addition, the thickness of the lower cladding layer 4 first formed may be either the same as or different from the thickness of the upper cladding layer 3 then formed for embedding the core pattern therein. However, from the viewpoints of reducing a whole thickness of the optical waveguide 1 and exhibiting a more excellent flexibility, the thickness of the lower cladding layer 4 is preferably smaller than that of the upper cladding layer 3. The thickness of the upper cladding layer 3 is preferably from 7 to 300 μm and more preferably from 7 to 200 μm. The thickness of the lower cladding layer 4 is preferably from 2 to 200 μm and more preferably from 2 to 150 μm. Meanwhile, the thickness of the upper cladding layer 3 means the value of a distance extending from a boundary between the core portion 2 and the lower cladding layer 4 to an upper surface of the upper cladding layer 3, whereas the thickness of the lower cladding layer 4 means the value of a distance extending from the boundary between the core portion 2 and the lower cladding layer 4 to a lower surface of the lower cladding layer 4.

In the case where the above cladding layer forming resin film is used for forming the cladding layer, the material of the support film used for producing the resin film is not particularly limited, and may be selected from various materials. From the viewpoints of a good flexibility and a good toughness required for the support film, as the material of the support film, there may be suitably used, for example, polyesters such as polyethylene terephthalate (PEI), polybutylene terephthalate and polyethylene naphthalate; polyethylenes; polypropylenes; polycarbonates; polyamides; polyimides; polyamide imides; polyether imides; polyphenylene ethers; polyether sulfides; polyether sulfones; polyether ketones; polyarylates; liquid crystal polymers; and polysulfones.

The thickness of the support film may appropriately vary depending upon the aimed flexibility thereof, and is preferably from 2 to 100 μm. When the thickness of the support film is 2 μm or more, the support film exhibits a sufficient toughness. When the thickness of the support film is 100 μm or less, the support film exhibits a sufficient flexibility. From the above viewpoints, the thickness of the support film is more preferably from 2 to 80 μm, still more preferably from 5 to 50 μm and further still more preferably from 8 to 25 μm.

When the support film used for forming the above cladding layer forming resin film has a combined function as the cover film 5 in the flexible optical waveguides shown in FIGS. 1(b) to 1(d), the support film is preferably subjected to adhesion-modifying treatment to apply the cladding layer forming resin varnish onto the thus treated surface of the support film. The adhesion-modifying treatment allows enhancement in bonding strength between the cladding layer and the support film, i.e., the cover film 5, and prevents occurrence of defective separation between the cladding layer and the cover film 5. The adhesion-modifying treatment used herein means such a treatment for enhancing a bonding strength between the cover film 5 and the cladding layer forming resin applied thereonto by formation of an adhesive resin coat or an antistatic resin coat, corona treatment, plasma treatment, reactive ion etching treatment, matting treatment by sandblast, etc.

[Core Layer Forming Resin]

The core layer forming resin used in the present invention is not particularly limited as long as it exhibits the aimed effects of the present invention. As the core layer forming resin, there may be suitably used photosensitive resin compositions having a higher refractive index than that of the cladding layer which is capable of forming the core pattern by irradiation with an activation light such as ultraviolet rays. More specifically, the core layer forming resin is preferably made of the same resin composition as used for the above cladding layer forming resin. Namely, the core layer forming resin may be in the form of a resin composition containing above components (A), (B) and (C), if required, together with the above various additives. Among these resin compositions, from the viewpoint of allowing the core portion to exhibit not only a high heat resistance and a high transparency, but also a higher refractive index than that of the cladding layer, especially preferred are resin compositions containing the ethoxylated fluorene-type di(meth)acrylate represented by the above general formula (1) and/or the (meth)acrylate represented by the above general formula (2) as the photopolymerizable compound (B).

The core layer forming resin may be used in the form of a core layer forming resin varnish which is prepared by dissolving the core layer forming resin in a suitable organic solvent, similarly to the cladding layer forming resin described above.

The core layer forming resin varnish is preferably prepared and subjected to filtration and defoaming by the same method as used above for the cladding layer forming resin varnish.

The core layer may be formed by applying the core layer forming resin varnish onto the lower cladding layer 4 by a suitable method such as spin-coating, and then removing the organic solvent therefrom. Alternatively, the core layer may be formed by applying the core layer forming resin varnish onto a suitable support film, removing the organic solvent therefrom to prepare a core layer forming resin film, and then attaching the thus prepared resin film onto the lower cladding layer 4 by a suitable method such as lamination.

The thickness of the core layer is preferably in the range of from 5 to 100 μm. When the thickness of the core layer is 5 μm or more, accurate positioning or alignment of a center of the core and a connecting terminal is readily carried out. When the thickness of the core layer is 100 μm or less, the resultant optical waveguide 1 exhibits a sufficient flexibility since the whole thickness thereof is not too large. From the above viewpoints, the thickness of the core layer is more preferably from 10 to 70 μm and still more preferably from 20 to 60 μm.

In the case where the core layer forming resin film is used for forming the core layer, the material of the support film used for production of the resin film is not particularly limited, and may be selected from various materials. From the viewpoints of a good flexibility and a high toughness required for the support film as well as a good transmittance of light used for forming the core pattern by exposure to light, as the material of the support film, there may be suitably used, for example, polyesters such as polyethylene terephthalate, polybutylene terephthalate and polyethylene naphthalate; polypropylenes; and polycarbonates.

The thickness of the support film may vary depending upon the aimed flexibility thereof, and is preferably in the range of from 5 to 50 μm. When the thickness of the support film is 5 μm or more, the support film exhibits a sufficient toughness. When the thickness of the support film is 50 μm or less, fine core pattern is suitably formed without an excessively large gap between the core layer and a photo-mask upon forming the core pattern. From the above viewpoints, the thickness of the support film is more preferably from 10 to 40 μm and still more preferably from 15 to 30 μm.

In addition, from the viewpoints of enhancement in transmittance of light for exposure and reduction in roughness on a side wall of the core pattern, there is preferably used a support film of a high transparency type containing no lubricant particles inside thereof. Examples of the support film include "COSMOSHINE A1517" and "COSMOSHINE A4100" (tradenames) both commercially available from TOYOBO Co., Ltd.

[Flexible Optical Waveguide]

The flexible optical waveguide of the present invention preferably has an increment of insertion loss of 0.1 dB or less upon subjecting the waveguide to a 360° bending test at a radius of curvature of 2 mm. When the increment of insertion loss of the flexible optical guide is 0.1 dB or less, the flexible optical guide provides a small loss when used in a bent state, thereby avoiding reduction in strength of signals transmitted therethrough. Meanwhile, the insertion loss means an optical loss mainly attributed to transmission loss and coupling loss.

In the flexible optical guide of the present invention, the relative refractive index difference between the core portion and the cladding layer is preferably from 1 to 10%. When the relative refractive index difference between the core portion and the cladding layer is 1% or more, the light transmitted through the core portion when the optical waveguide is used in a bent state is prevented from undergoing leakage to the cladding layer. When the relative refractive index difference between the core portion and the cladding layer is 10% or less, the light transmitted is prevented from excessively spreading at a joint portion between the optical waveguide and optical fibers, etc., thereby avoiding increase in coupling loss. From the above viewpoints, the relative refractive index difference between the core portion and the cladding layer is more preferably from 1.5 to 7.5% and still more preferably from 2 to 5%. Meanwhile, the relative refractive index difference between the core portion and the cladding layer is determined according to the following formula:

Relative Refractive Index Difference (%)=[(Refractive Index of Core Portion)$^2$−(Refractive Index of Cladding Layer)$^2$]/[2×(Refractive Index of Core Portion)$^2$]×100

The flexible optical waveguide of the present invention preferably has an increment of insertion loss of 0.1 dB or less after subjecting the waveguide to a repeated bending test at a radius of curvature of 5 mm 100,000 times. When the increment of insertion loss of the flexible optical waveguide after subjected to the repeated bending test is 0.1 dB or less, the optical waveguide enables a stable light transmission therethrough for a long period of time, and is therefore applicable to movable portions that are exposed to repeated motion, for example, hinged portions of cellular phones. From the above viewpoints, the increment of insertion loss of the flexible optical waveguide after subjected to the repeated bending test is more preferably 0.05 dB or less.

In addition, after being subjected to the repeated bending test at a radius of curvature of 2 mm 100,000 times, the core portion of the flexible optical waveguide is preferably free from occurrence of cracks when observed by a magnifying glass, a microscope or naked eyes. Further, from the viewpoint of good mechanical properties of the flexible optical waveguide, the cladding layer is also preferably free from occurrence of cracks after the repeated bending test.

The flexible optical waveguide of the present invention preferably has an elastic modulus of from 0.05 to 6 GPa upon subjecting the waveguide to a film tensile test. When the elastic modulus of the flexible optical waveguide is 0.05 GPa or more, the resultant flexible optical waveguide exhibits a sufficient flexibility, and is prevented from suffering from adverse influence on transmission characteristics owing to deformation thereof upon bending. When the elastic modulus of the flexible optical waveguide is 6 GPa or less, the flexible optical waveguide is prevented from suffering from breakage upon bending owing to brittleness thereof. From the above viewpoints, the elastic modulus of the flexible optical waveguide upon subjecting the waveguide to a film tensile test is more preferably from 0.1 to 6 GPa, still more preferably from 0.2 to 5 GPa and further still more preferably from 0.5 to 4 GPa. Meanwhile, the elastic modulus means a gradient of a tangential line at the origin of a load-elongation curve obtained in the film tensile test.

The flexible optical waveguide of the present invention preferably has a maximum elongation of from 3 to 50% upon subjecting the waveguide to the film tensile test. When the maximum elongation of the flexible optical waveguide is 3% or more, the flexible optical waveguide is prevented from suffering from breakage upon bending owing to brittleness thereof. When the maximum elongation of the flexible optical waveguide is 50% or less, the resultant flexible optical waveguide exhibits a sufficient flexibility, and is prevented from suffering from adverse influence on transmission characteristics owing to deformation thereof upon bending. From the above viewpoints, the maximum elongation of the flexible optical waveguide when subjected to the film tensile test is more preferably from 5 to 40%. Meanwhile, the maximum elongation means an elongation observed at the time at which a maximum load is applied to the film in the film tensile test.

The thickness of the flexible optical waveguide of the present invention is preferably in the range of from 9 to 500 μm. When the thickness of the flexible optical waveguide is 9 μm or more, the flexible optical waveguide is prevented from suffering from breakage upon bending owing to insufficient strength thereof. When the thickness of the flexible optical waveguide is 500 μm or less, the flexible optical waveguide exhibits a sufficient flexibility. From the above viewpoints, the thickness of the flexible optical waveguide is more preferably from 10 to 300 μm, still more preferably from 20 to 200 μm and further still more preferably from 30 to 150 μm.

The flexible optical waveguide of the present invention preferably has an increment of transmission loss of 0.05 dB/cm or less after subjecting the waveguide to a reflow test at a maximum temperature of 265° C. three times. When the increment of transmission loss of the flexible optical waveguide after the reflow test is 0.05 dB/cm or less, the flexible optical waveguide can be readily subjected to a reflow process in view of a good reliability upon mounting parts, resulting in more extensive applications of the flexible optical waveguide. From the above viewpoints, the increment of transmission loss of the flexible optical waveguide after the reflow test is more preferably 0.03 dB or less. Meanwhile, the reflow test at a maximum temperature of 265° C. means a lead-free solder reflow test conducted under the conditions according to IPC/JEDEC J-STD-020B.

The flexible optical waveguide of the present invention preferably has transmission loss of 0.3 dB or less. When the transmission loss of the flexible optical waveguide is 0.3 dB or less, the flexible optical waveguide is prevented from suffering from deterioration in strength of transmission signal owing to optical loss. From the above viewpoints, the transmission loss of the flexible optical waveguide is more preferably 0.2 dB or less and still more preferably 0.1 dB or less.

When using the above resin composition for forming the flexible optical waveguide of the present invention, in order to evaluate various properties of a cured product of the resin composition such as heat resistance, flexibility and strength, various characteristics of the cured product such as, for example, a glass transition temperature, a 5% mass reduction temperature, a tensile modulus, a maximum tensile strength, a maximum elongation, a coefficient of linear expansion and a water absorption may be measured by conventionally known methods.

The process for producing the flexible optical waveguide of the present invention is not particularly limited. As described above, the flexible optical waveguide of the present invention may be produced by the method of applying the core layer forming resin varnish and/or the cladding layer forming resin varnish by spin-coating, the method using the core layer forming resin film and/or the cladding layer forming resin film, or combination of these methods. Among these methods, from the viewpoint of allowing a large area optical waveguide to be produced collectively with low costs, the method using the resin films is preferred.

Next, in consideration of a configuration of the flexible optical waveguide, there are present four kinds of structures as shown in FIGS. 1(a) to 1(d). In the following description, the process for producing the flexible optical waveguide having the structure shown in FIG. 1(d) in which the cover film 5 is disposed on an outside of each of the lower cladding layer 4 and the upper cladding layer 3, by using the core layer forming resin film and the cladding layer forming resin film, is described in detail.

In the first step, the cladding layer forming resin contained in the cladding layer forming resin film composed of the cladding layer forming resin and the support film is cured by exposure to light and/or heat to form the lower cladding layer 4.

In the first step for forming the lower cladding layer 4, when a protective film is provided on one side of the cladding layer forming resin film opposed to the side where the support film is disposed, the protective film is peeled off from the resin film, and then the cladding layer forming resin is cured by exposure to light and/or heat to form the lower cladding layer 4.

The amount of light irradiated upon forming the lower cladding layer 4 is preferably from 0.1 to 5 J/cm$^2$, and the heating temperature used thereupon is preferably from 50 to 130° C. However, these conditions are not particularly limited to the above specified ranges.

Next, in the second step, the core layer forming resin film composed of the core layer forming resin and the support film is laminated onto the thus formed lower cladding layer 4 to form the core layer. In the second step, the core layer forming resin film is press-bonded under heating onto the lower cladding layer 4, thereby forming the core layer having a higher refractive index than that of the lower cladding layer 4.

Examples of the laminating method used in the second step include those methods using a roll laminator or a flat plate-type laminator. From the viewpoints of a close contact between the layers as well as a good followability, the core layer forming resin film is preferably laminated on the lower cladding layer under reduced pressure by using the flat plate-type laminator. Meanwhile, the flat plate-type laminator used in the present invention means such a laminator having a pair of flat plates between which materials to be laminated are sandwiched and press-bonded to each other by applying a pressure to the flat plates. For example, a vacuum pressure-type laminator may be suitably used as the flat plate-type laminator. The heating temperature used in the lamination method is preferably from 50 to 130° C., and the bonding pressure is preferably from 0.1 to 1.0 MPa (from 1 to 10 kgf/cm$^2$). However, these conditions are not particularly limited to the above specified ranges.

Meanwhile, prior to the lamination procedure using the vacuum pressure-type laminator, the core layer forming resin film may be preliminarily attached onto the lower cladding layer 4 using a roll laminator. In this case, from the viewpoints of a close contact between the layers and a good followability, the preliminary attachment between the resin film and the lower cladding layer is preferably conducted while press-bonding these layers to each other. The press-bonding may be performed while heating by using a laminator having a heating roll. The laminating temperature is preferably in the range of from room temperature (25° C.) to 100° C. When the laminating temperature is room temperature (25° C.) or higher, adhesion between the lower cladding layer 4 and the core layer is enhanced. When the laminating temperature is 100° C. or lower, the core layer is prevented from being fluidized upon the lamination using a roll, thereby enabling formation of the film having a thickness as desired. From the above viewpoints, the laminating temperature is more preferably from 40 to 100° C. The laminating pressure is preferably from 0.2 to 0.9 MPa, and the laminating velocity is preferably from 0.1 to 3 m/min. However, these conditions are not particularly limited to the above specified ranges.

Next, in the third step, the core layer is developed by exposure to light to form a core pattern (core portion 2) of the optical waveguide. More specifically, an activation light is irradiated in an image-like manner onto the core layer through a negative mask pattern. Examples of a light source for the activation light include conventionally known light sources capable of effectively irradiating ultraviolet rays such as a carbon arc lamp, a mercury vapor arc lamp, an ultra-high pressure mercury lamp, a high-pressure mercury lamp and a xenon lamp. Alternatively, as the light source, there may also be used a flood lighting lamp for photograph, a solar lamp, etc., which are capable of effectively irradiating visible light. The amount of the activation light irradiated is preferably from 0.01 to 10 J/cm$^2$. When the amount of the activation light irradiated is 0.01 J/cm$^2$ or more, a curing reaction of the core portion proceeds sufficiently, thereby avoiding run-off of the core pattern in the below-mentioned developing step. When the amount of the activation light irradiated is 10 J/cm$^2$ or less, the core pattern is prevented from being thickened owing to excessive exposure to light, resulting in formation of fine patterns. From the above viewpoints, the amount of the activation light irradiated is more preferably from 0.05 to 5 J/cm$^2$ and still more preferably from 0.1 to 2 J/cm$^2$.

After the exposure to light, from the viewpoints of enhancement in resolution of the core pattern and improvement in close contact thereof with adjacent layers, the resultant core pattern may be heated. The time elapsed from completion of irradiation with ultraviolet rays to initiation of heating after the exposure to light is preferably within a period of from 30 s to 10 min. When the time elapsed lies within the above specified range, active species produced by the irradiation with ultraviolet rays are prevented from being deactivated. The temperature used upon heating after the exposure to light is preferably from 40 to 160° C.

Next, the support film of the core layer forming resin film is peeled off therefrom, and the non-exposed portion of the core layer is removed by a wet developing method, etc., thereby forming the core pattern of the optical waveguide. In the wet developing method, the core layer may be developed using an organic solvent-based developing solution suitable for a composition of the film.

Examples of the organic solvent-based developing solution include acetone, methanol, ethanol, isopropanol, methyl ethyl ketone, methyl isobutyl ketone, cyclohexanone, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene, N,N-dimethylformamide, N,N-dimethylacetamide and N-methylpyrrolidone. Among these organic solvents, from the viewpoints of a good dissolvability, preferred are methyl ethyl ketone, methyl isobutyl ketone, cyclohexanone, methyl lactate, ethyl lactate, γ-butyrolactone, ethyl cellosolve, butyl cellosolve, propylene glycol monomethyl ether, propylene glycol monomethyl ether acetate, N,N-dimethylacetamide and N-methylpyrrolidone. These organic solvents may be blended with water in an amount of from 1 to 20% by mass in order to prevent inflammation thereof.

Also, these organic solvents may be used alone or in combination of any two or more thereof. However, from the viewpoint of well-controlled dissolvability of the non-exposed portions therein, these organic solvents are preferably used in combination of any appropriate two or more thereof. Specific examples of the combination of the organic solvents include propylene glycol monomethyl ether acetate/N,N-dimethylacetamide, propylene glycol monomethyl ether acetate/N-methylpyrrolidone, ethyl lactate/N,N-dimethylacetamide, ethyl lactate/N-methylpyrrolidone, γ-butyrolactone/N,N-dimethylacetamide and γ-butyrolactone/N-methyl pyrrolidone.

Examples of the developing method include a dipping method, a paddling method, a spraying method such as a high-pressure spraying method, a brushing method and a scrapping method. Among these methods, from the viewpoint of improved resolution, the high-pressure spraying method is most suitable.

After the development, the resultant core pattern of the optical waveguide may be washed with the above organic solvents.

Examples of the organic solvent-based washing solution include acetone, methanol, ethanol, isopropanol, ethyl acetate, butyl acetate, ethyl lactate, γ-butyrolactone, methyl cellosolve, ethyl cellosolve, butyl cellosolve, propylene glycol monomethyl ether, propylene glycol monomethyl ether acetate, toluene and xylene. Among these organic solvents, from the viewpoints of a good dissolvability, preferred are methanol, ethanol, isopropanol and ethyl acetate. These organic solvents may be blended with water in an amount of from 1 to 20% by mass in order to prevent inflammation thereof.

Also, these organic solvents may be used alone or in combination of any two or more thereof.

Examples of the washing method include a dipping method, a paddling method, a spraying method such as a high-pressure spraying method, a brushing method and a scrapping method.

After the exposure to light or the washing treatment, if required, the obtained optical waveguide may be heated at a temperature of from about 60 to about 250° C. or exposed to light in an amount of about 0.1 to about 1000 mJ/cm$^2$ to further cure the core pattern.

Thereafter, in the fourth step, the cladding layer forming resin film is laminated over the core pattern and cured to embed the core pattern thereunder. Specifically, the cladding layer forming resin film is press-bonded under heating onto the core pattern by the same method as used above, thereby forming the upper cladding layer 3. At this time, the thickness of the upper cladding layer 3 is preferably larger than that of the core layer.

Examples of the laminating method used in the fourth step include those methods using a roll laminator or a flat plate-type laminator. From the viewpoints of a close contact between the layers as well as a good followability and a good flatness, the cladding layer forming resin film is preferably laminated under reduced pressure over the core pattern by using the flat-plate-type laminator and more preferably using a vacuum pressure-type laminator in the same manner as used above in the second step. The heating temperature used in the lamination method of the fourth step is preferably from 50 to 130° C., and the bonding pressure is preferably from 0.1 to 1.0 MPa (from 1 to 10 kgf/cm²). However, these conditions are not particularly limited to the above specified ranges.

The curing procedure in the fourth step may be performed by exposure to light and/or heat similarly to the first step. The amount of an activation light irradiated upon forming the upper cladding layer 3 is preferably from 0.1 to 30 J/cm².

When PET is used as the support film of the cladding layer forming resin film, the amount of the activation light irradiated is preferably from 0.1 to 5 J/cm². On the other hand, when the support film is made of polyethylene naphthalate, polyamides, polyimides, polyamide imides, polyether imides, polyphenylene ethers, polyether sulfides, polyether sulfones, polysulfones, etc., which hardly allow the activation light having a short wavelength such as ultraviolet rays to penetrate therethrough as compared to PET, the amount of the activation light irradiated is preferably from 0.5 to 30 J/cm². When the amount of the activation light irradiated is 0.5 J/cm² or more, the curing reaction proceeds sufficiently. When the amount of the activation light irradiated is 30 J/cm² or less, the time required for the irradiation with light is suitably shortened. From the above viewpoints, the amount of the activation light irradiated is more preferably from 3 to 27 J/cm² and still more preferably from 5 to 25 J/cm².

Meanwhile, to further facilitate the curing reaction, there may be used a double-side exposure device capable of irradiating light from both sides at the same time. In addition, the activation light may be irradiated while heating. The heating temperature during and/or after irradiating the activation light is preferably from 50 to 200° C. However, these conditions are not particularly limited to the above specified ranges.

The flexible optical waveguide of the present invention is excellent in flexing property, heat resistance and transparency and, therefore, may be suitably used as an optical transmission line of optical modules. Examples of the configuration of the optical modules include, but are not limited to, an optical waveguide with optical fibers coupled to both terminal ends thereof, an optical waveguide with connectors coupled to both terminal ends thereof, a photoelectric composite substrate constructed from combination of an optical waveguide and a printed wiring board, a photoelectric conversion module constructed from combination of an optical waveguide and an optical/electric transfer element which is capable of mutually transferring light signals to electric signals and vice versa, and a wavelength multiplexer/demultiplexer constructed from combination of an optical waveguide and a wavelength split filter. Meanwhile, the printed wiring board used in the photoelectric composite substrate is not particularly limited, and there may be used either a rigid substrate such as a glass epoxy substrate or a flexible substrate such as a polyimide substrate.

EXAMPLES

The present invention is described in more detail below with reference to the following Production Examples and Examples. However, these examples are only illustrative and not intended to limit the invention thereto.

Also, properties of the cured films obtained by curing resin films in the following Production Examples were evaluated concerning the following items
(1) to (6).

(1) Measurement of Refractive Index

The refractive indices of the obtained cured films were respectively measured at a wavelength of 830 nm using a prism coupler "Model 2010" available from Metricon Corp.

(2) Measurement of Glass Transition Temperature by Dynamic Mechanical Analysis (DMA) Method The glass transition temperatures of the obtained cured films were respectively measured in a temperature range of from −50° C. to 250° C. at a temperature rise rate of 5° C./min using a dynamic viscoelasticity measuring apparatus "Solids Analyzer RSA-II" available from Rheometric Scientific Corp. The peak of loss tangent (Tan δ) was determined as the glass transition temperature.

(3) Measurement of 5% Mass Reduction Temperature

The 5% mass reduction temperatures of the obtained cured films were respectively measured in air in a temperature range of from 30 to 600° C. at a temperature rise rate of 10° C./min using a thermogravimetry-differential thermal analysis (TG-DTA) apparatus "EXSTAR6000 TG/DTA6300" available from Seiko Instruments Inc.

(4) Film Tensile Test

The respective obtained cured films each having a width of 10 mm, a length of 70 mm, a distance between grips of 50 mm and a thickness of 100 μm were subjected to film tensile test at a temperature of 25° C. and a pulling rate of 5 mm/min using a tensile tester "AUTOGRAPH AGS-5KNG Model" available from Shimadzu Corp., according to JIS K 7127 to determine a tensile modulus, a maximum tensile strength and a maximum elongation of the films.

Meanwhile, the maximum elongation was calculated from the following formula:

Maximum Elongation (%)=[(Distance between Grips upon Application of Maximum Load)−(Initial Distance between Grips)]/(Initial Distance between Grips)×100

(5) Measurement of Linear Expansion Coefficient

The linear expansion coefficients $\alpha_1$ and $\alpha_2$ of the obtained cured films each having a width of 3 mm, a length of 25 mm, a distance between grips of 15 mm and a thickness of 100 μm were respectively measured in a nitrogen atmosphere in a temperature range of from 25 to 300° C. at a temperature rise rate of 5° C./min using a thermomechanical analysis (TMA) apparatus "EXSTAR6000 TMA/SS6100" available from Seiko Instruments Inc.

Meanwhile, $\alpha_1$ represents a linear expansion coefficient at a temperature lower by 10 to 50° C. than the glass transition temperature, whereas $\alpha_2$ represents a linear expansion coefficient at a temperature higher by 10 to 50° C. than the glass transition temperature.

(6) Measurement of Water Absorption

The water absorption of the respective obtained cured films was measured by the following method. That is, each of the obtained cured films was cut into a size of 10 cm×10 cm, heated and dried at 100° C. for 1 h and then subjected to measurement of a mass thereof (dry mass). The thus treated films were allowed to stand in water at 25° C. for 24 h to sufficiently absorb water therein. After taking the films out of water, an excess amount of water on the surface of the respective films was wiped off, and then the films were immediately subjected to measurement of a mass thereof (wet mass).

Meanwhile, the water absorption is calculated from the following formula:

Water Absorption (%)=(Wet Mass−Dry Mass)/Dry Mass×100

In addition, the flexible optical waveguides obtained in the following Examples were evaluated to examine the following items (1) to (6).

(1) 360° Bending Test

The respective obtained flexible optical waveguides (each having a waveguide length of 5 cm) were wound by one turn around a bar having a radius of 2 mm. Using VCSEL "FLS-300-01-VCL" available from EXFO Corp., capable of emitting light having a central wavelength of 850 nm as a light source, a light receiving sensor "Q82214" available from Advantest Corp., a light-incidence fiber (GI-50/125 multimode fiber; NA=0.20) and a light-emission fiber (SI-114/125; NA=0.22), the insertion loss of the respective optical waveguides when subjected to 360° bending test at a radius of curvature of 2 mm was measured to examine an increment of the insertion loss based on insertion loss of the optical waveguides unwound around the bar.

Figure 3:
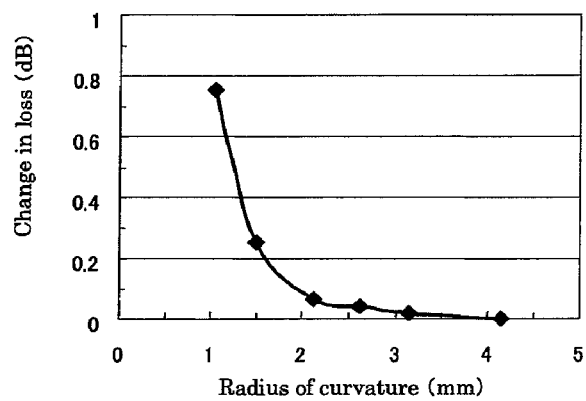
FIG. 3 is a view showing a relationship between a radius of curvature and change in loss upon subjecting a flexible optical waveguide produced in Example 1 to a 360° bending test.

Meanwhile, in Example 1, in addition to the above test, the 360° bending test at each radius of curvature as shown in FIG. 3 was carried out in the same manner to measure an insertion loss of the respective flexible optical waveguides and examine an increment of the insertion loss thereof.

(2) Relative Refractive Index Difference

The relative refractive index difference between the core portion and the cladding layer of each of the obtained flexible optical waveguides was calculated on the basis of the refractive index of the cured film obtained from the core layer forming resin film (cured film for core) and the refractive index of the cured film obtained from the cladding layer forming resin film (cured film for cladding).

Meanwhile, the relative refractive index difference was calculated from the following formula:

Relative refractive index difference (%)=[(Refractive Index of Core Portion)$^2$−(Refractive Index of Cladding Layer)$^2$]/[2×(Refractive Index of Core Portion)$^2$]×100

(3) Repeated Bending Test

The obtained flexible optical waveguides (waveguide length: 5 cm) were respectively subjected to repeated bending test at a radius of curvature of 5 mm and a flexing rate of about 1 s using a flexing durability tester available from Daisho Denshi Co., Ltd. After carrying out the repeated bending test 100,000 times, the insertion loss of the respective flexible optical waveguides was measured using the same light source, light receiving element, light-incidence fiber and light-emission fiber as used above to examine an increment of the insertion loss relative to insertion loss before the test.

Also, after the repeated bending test was carried out at a radius of curvature of 2 mm and a flexing rate of about 1 s 100,000 times, the respective flexible optical guides were observed by a metallurgical microscope "BHMJL" available from Olympus Corp., to examine whether or not any cracks occurred in the core and cladding portions thereof.

Figure 4:
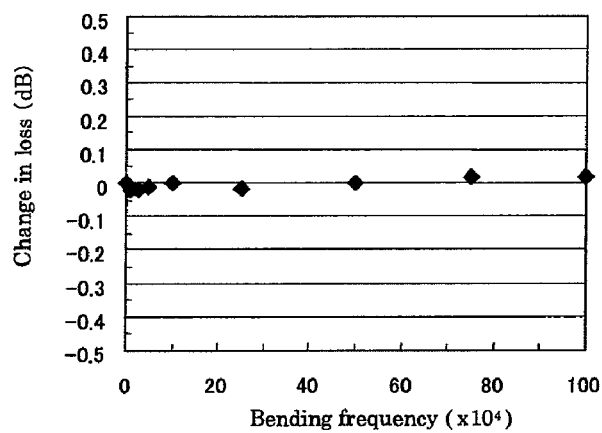
FIG. 4 is a view showing a relationship between a frequency of bending operations and change in loss upon subjecting a flexible optical waveguide produced in Example 1 to a repeating bending test.

Meanwhile, in Example 1, in addition to the above test, the repeated bending test was also carried out at a frequency of bending operations as shown in FIG. 4 in the same manner as described above to measure the insertion loss of the optical waveguides and examine an increment of the insertion loss.

(4) Film Tensile Test

The obtained flexible optical waveguides each having a width of 5 mm, a length of 50 mm, a distance between grips of 30 mm and a thickness as shown in FIG. 3 were respectively subjected to film tensile test by the same method and under the same conditions as used above to determine an elastic modulus and a maximum elongation thereof.

(5) Measurement of Thickness

The thickness of the respective obtained flexible optical waveguides was measured using Degimatic Indicator available from Mitsutoyo Corp.

(6) Reflow Test

Figure 2:
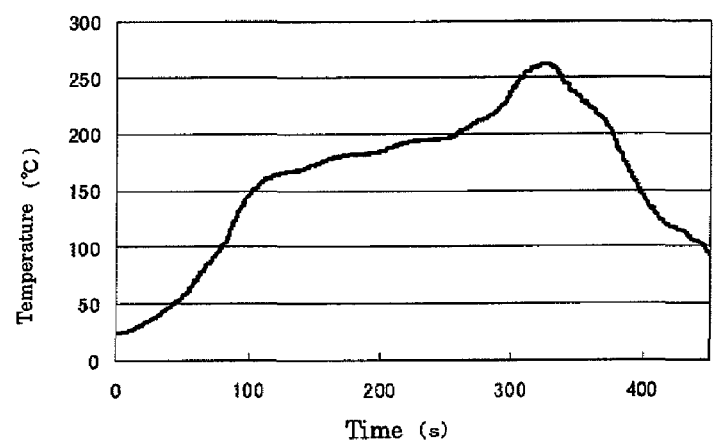
FIG. 2 is a temperature profile of an inside of a reflow oven used in a reflow test carried out in the present invention.

The obtained flexible optical waveguides (waveguide length: 5 cm) were respectively subjected to a lead-free solder reflow test at a maximum temperature of 265° C. three times according to IPC/JEDEC J-STD-020B using a reflow tester "SALAMANDER XNA-645PC" available from Furukawa Electric Co., Ltd. The detailed conditions of the reflow test are shown in Table 1, and the temperature profile within a reflow oven is shown in FIG. 2. The transmission loss of the respective flexible optical waveguides after subjected to the reflow test was measured using the same light source, light receiving element, light-incidence fiber and light-emission fiber as used above to determine an increment of the transmission loss relative to transmission loss before the reflow test.

TABLE 1

| Zone No. | 1 | 2 | 3 | 4 | 5 | 6 | 7 |
|---|---|---|---|---|---|---|---|
| Temperature ser for upper heater (° C.) | 175 | 195 | 220 | 250 | 280 | 220 | 0 |
| Temperature set for lower heater (° C.) | 175 | 195 | 220 | 250 | 300 | 240 | — |
| Conveyor speed (cm/min) | | | | 60 | | | |

(7) Measurement of Transmission Loss

The transmission loss of the respective obtained flexible optical waveguides was measured using the same light source, light receiving element, light-incidence fiber and light-emission fiber as used above by a cut-back method (waveguide length measured: 5, 3 and 2 cm).

Production Example 1

Production of Cladding Layer Forming Resin Film A

Fifty parts by mass of a phenoxy resin (tradename: "PHENOTOHTO YP-70" available from Tohto Kasei Co., Ltd.) as the binder polymer (A), 50 parts by mass of alicyclic diepoxycarboxylate (tradename: "KRM-2110"; molecular weight: 252; available from ADEKA Corp.) as the photopolymerizable compound (B), 4 parts by mass of triphenyl sulfonium hexafluoroantimonate (tradename: "SP-170" available from ADEKA Corp.) as the photopolymerization initiator (C), 0.4 part by mass of "SP-100" (tradename) available from ADEKA Corp. as a sensitizer, and 40 parts by mass of propylene glycol monomethyl ether acetate as an organic solvent, were weighed and charged into a wide-mouthed polymeric bottle, and mixed with each other under stirring at a temperature of 25° C. and a rotating speed of 400 rpm for 6 h using a mechanical stirrer, shaft and propeller, thereby preparing a cladding layer forming resin varnish A. Thereafter, the obtained resin varnish was subjected to filtration under pressure through a Polyflon filter (tradename: "PF020" available from Advantec Toyo Kaisha, Ltd.) at 25° C. under a pressure of 0.4 MPa, and further subjected to defoaming under a reduced pressure of 50 mmHg for 15 min using a vacuum pump and a bell-jar.

The cladding layer forming resin varnish A prepared above was applied onto a corona-treated surface of a polyamide film (tradename: "MICTRON" available from Toray Industries, Inc.; thickness: 12 μm) using a coater "MULTICOATER TM-MC" available from Hirano Tecseed Co., Ltd., and dried at 80° C. for 10 min and then at 100° C. for 10 min. Next, a release PET film (tradename: "A31" available from Teijin DuPont Films Japan, Ltd.; thickness: 25 μm) as a protective film was laminated on the resultant coating layer such that a release surface of the release film faced to the resin side, thereby obtaining a cladding layer forming resin film A. At this time, the thickness of the resin layer may be optionally controlled by adjusting a gap of the coater. In Production Example 1, the thickness of the cured film was controlled such that the thickness of a lower cladding layer was 30 μm, and the thickness of an upper cladding layer was 80 μm.

Production Example 2

Production of Core Layer Forming Resin Film B

The same procedure for preparation of the resin varnish as described in Production Example 1 was repeated except for using 10 parts by mass of a phenoxy resin (tradename: "PHENOTOHTO YP-70" available from Tohto Kasei Co., Ltd.) as the binder polymer (A), 45 parts by mass of 9,9-bis[4-(2-acryloyloxyethoxy)phenyl]fluorene (tradename: "A-BPEF" available from Shin-Nakamura Chemical Co., Ltd.) and 45 parts by mass of bisphenol A-type epoxy acrylate (tradename: "EA-1020" available from Shin-Nakamura Chemical Co., Ltd.) as the photopolymerizable compounds (B), 2 parts by mass of bis(2,4,6-trimethylbenzoyl)phenyl phosphine oxide (tradename: "IRGACURE 819" available from Ciba Specialty Chemicals, Corp.) as the photopolymerization initiator (C), and 40 parts by mass of propylene glycol monomethyl ether acetate as the organic solvent, thereby preparing a core layer forming resin varnish B. Thereafter, the obtained resin varnish was subjected to filtration under pressure and then to defoaming under a reduced pressure in the same manner as in Production Example 1 except for using a Polyflon filter having a pore size of 2 μm (tradename: "PF020" available from Advantec Toyo Kaisha, Ltd.) and a membrane filter having a pore size of 0.5 μm (tradename: "J050A" available from Advantec Toyo Kaisha, Ltd.) as the filters for filtration under pressure.

The core layer forming resin varnish B prepared above was applied onto a non-treated surface of a PET film (tradename: "COSMOSHINE A1517" available from TOYOBO Co., Ltd.; thickness: 16 μm) and then dried by the same method as described in Production Example 1. Next, a release PET film (tradename: "A31" available from Teijin DuPont Film Co., Ltd.; thickness: 25 μm) as a protective film was laminated on the resultant coating layer such that a release surface of the release film faced to the resin side, thereby obtaining a core layer forming resin film B. In Production Example 2, the gap of the coater was controlled such that the thickness of the resultant cured film was 50 μm.

[Production of Cured Film for Measurement of Properties]

The thus obtained core layer forming resin film B was irradiated with ultraviolet rays (wavelength: 365 nm) at 1 J/cm$^2$ using an ultraviolet exposure device "EXM-1172" available from Orc Manufacturing Co., Ltd. Then, the release PET film (A31) was peeled off from the resin film B. Finally, the resin film was further dried under heating at 160° C. for 1 h, and the PET film (A1517) was peeled off therefrom, thereby obtaining a cured film.

The thus obtained cured film was subjected to measurements of refractive index, glass transition temperature and 5% mass reduction temperature, tensile test, and measurements of linear expansion coefficient and water absorption. The results are shown in Table 2.

Production Example 3

Production of Core Layer Forming Resin Film C

The same procedure for preparation of the resin varnish and resin film as described in Production Example 2 was repeated except for using 25 parts by mass of a phenoxy resin (tradename: "PHENOTOHTO YP-70" available from Tohto Kasei Co., Ltd.) as the binder polymer (A), 37.5 parts by mass of 9,9-bis[4-(2-acryloyloxyethoxy)phenyl]fluorene (tradename: "A-BPEF" available from Shin-Nakamura Chemical Co., Ltd.) and 37.5 parts by mass of bisphenol A-type epoxy acrylate (tradename: "EA-1020" available from Shin-Nakamura Chemical Co., Ltd.) as the photopolymerizable compounds (B), 2 parts by mass of bis(2,4,6-trimethylbenzoyl)phenyl phosphine oxide (tradename: "IRGACURE 819" available from Ciba Specialty Chemicals, Corp.) as the photopolymerization initiator (C), and 40 parts by mass of propylene glycol monomethyl ether acetate as the organic solvent, thereby preparing a core layer forming resin varnish C and a core layer forming resin film C.

[Production of Cured Film for Measurement of Properties]

The thus obtained core layer forming resin film C was treated in the same manner and under the same conditions as described in Production Example 2, thereby obtaining a cured film for measuring properties thereof. The thus obtained cured film was subjected to measurements of refractive index, glass transition temperature and 5% mass reduction temperature, tensile test, and measurements of linear expansion coefficient and water absorption. The results are shown in Table 2.

Production Example 4

Production of Cladding Layer Forming Resin Film D

The same procedure as described in Production Example 1 was repeated except for using a PET film (tradename: "COSMOSHINE A1517" available from TOYOBO Co., Ltd.; thickness: 16 μm; coating surface: antistatic-treated surface) in place of the polyamide film as the support film of the cladding layer forming resin film A, thereby obtaining a cladding layer forming resin film D.

Production Example 5

Production of Cladding Layer Forming Resin Film E

The same procedure as described in Production Example 1 was repeated except for using a PET film (tradename: "COS- MOSHINE A1517" available from TOYOBO Co., Ltd.; thickness: 16 μm; coating surface: non-treated surface) in place of the polyamide film as the support film of the cladding layer forming resin film A, thereby obtaining a cladding layer forming resin film E.

[Production of Cured Film for Measurement of Properties]

The thus obtained cladding layer forming resin film E was irradiated with ultraviolet rays (wavelength: 365 nm) at 1 J/cm$^2$ using an ultraviolet exposure device "EXM-1172" available from Orc Manufacturing Co., Ltd. Then, the release PET film (A31) as the protective film was peeled off from the resin film E. Finally, the resin film was further dried under heating at 160° C. for 1 h, and the PET film (A1517) as the support film was peeled off therefrom, thereby obtaining a cured film.

The thus obtained cured film was subjected to measurements of refractive index, glass transition temperature and 5% mass reduction temperature, tensile test, and measurements of linear expansion coefficient and water absorption. The results are shown in Table 2.

TABLE 2

| Items | Production Example 2 | Production Example 3 | Production Example 5 |
|---|---|---|---|
| Samples | Core layer forming resin film B | Core layer forming resin film C | Cladding layer forming resin film E |
| Refractive index*[1] | 1.583 | 1.584 | 1.548 |
| Glass transition temperature (° C.)*[2] | 130 | 120 | 150 |
| 5% Mass reduction temperature (° C.) | 350 | 350 | 310 |
| Tensile modulus (GPa) | 2 | 2.2 | 1.5 |
| Maximum tensile strength (MPa) | 30 | 30 | 65 |
| Maximum elongation (%) | 2 | 2 | 10 |
| Linear expansion coefficient $\alpha_1$, $\alpha_2$ (ppm/° C.)*[3] | $\alpha_1$: 60 $\alpha_2$: 170 | $\alpha_1$: 60 $\alpha_2$: 170 | $\alpha_1$: 50 $\alpha_2$: 140 |
| Water absorption (%) | 1 | 1 | 2 |

Note
*[1]Measured with a wavelength of 830 nm at 25° C.;
*[2]DMA method;
*[3]TMA method; $\alpha_1$: Linear expansion coefficient measured at a temperature lower by 10 to 50° C. than glass transition temperature; $\alpha_2$: Linear expansion coefficient measured at a temperature higher by 10 to 50° C. than glass transition temperature.

The cured films obtained in Production Examples 2, 3 and 5 exhibited a good heat resistance, a low moisture absorption and a low linear expansion coefficient, and were excellent in mechanical properties. In these cured films, since the core layer forming resin film had a higher refractive index than that of the cladding layer forming resin film, it was confirmed that the cured films were useful as a material for flexible optical waveguides.

Example 1

Production of Flexible Optical Waveguide

The release PET film (A31) as the protective film for the cladding layer forming resin film A obtained in Production Example 1 was peeled off from the resin film A. The resultant resin film was irradiated with ultraviolet rays (wavelength: 365 nm) at 1 J/cm$^2$ from the resin side (the side opposite to the base film) using an ultraviolet exposure device "EXM-1172" available from Orc Manufacturing Co., Ltd. Then, the resin film was heat-treated at 80° C. for 10 min, thereby forming a lower cladding layer 4.

Next, the core layer forming resin film B obtained in Production Example 2 was laminated onto the resultant lower cladding layer 4 at a pressure of 0.4 MPa and a temperature of 50° C. for a pressing time of 30 s using a vacuum pressure-type laminator "MVLP-500" available from Meiki Seisakusho Co., Ltd., thereby forming a core layer.

The thus formed core layer was irradiated with ultraviolet rays (wavelength: 365 nm) at 0.5 J/cm$^2$ through a negative-type photomask having a width of 50 μm using the same ultraviolet exposure device as used above, and then heated at 80° C. for 5 min after the exposure. Thereafter, the PET film as the support film was peeled off from the resin film, and the core layer was developed with a developing solution (containing propylene glycol monomethyl ether acetate and N,N-dimethylacetamide at a mass ratio of 8/2), thereby forming a core pattern (core portion 2). Successively, the resultant resin film was rinsed with a washing solution (isopropanol), and then dried under heating at 100° C. for 10 min.

Next, the cladding layer forming resin film A obtained in Production Example 1 was laminated as the upper cladding layer on the above resin film under the same conditions as described above. The resultant laminate was irradiated with ultraviolet rays (wavelength: 365 nm) at 25 J/cm$^2$ in total from both sides thereof, and then heat-treated at 160° C. for 1 h to form the upper cladding layer 3, thereby obtaining a flexible optical waveguide 1 as shown in FIG. 1(d) in which the cover film 5 was disposed outside of each of the upper and lower cladding layers. Thereafter, the resultant flexible optical waveguide was cut into a test specimen of the optical waveguide 1 having a waveguide length of 5 cm using a dicing saw "DAD-341" available from Disco Corp.

Meanwhile, in the above optical waveguide, the cover film 5 was made of the polyamide film used as the support film of the cladding layer forming resin film A.

Figure 5:
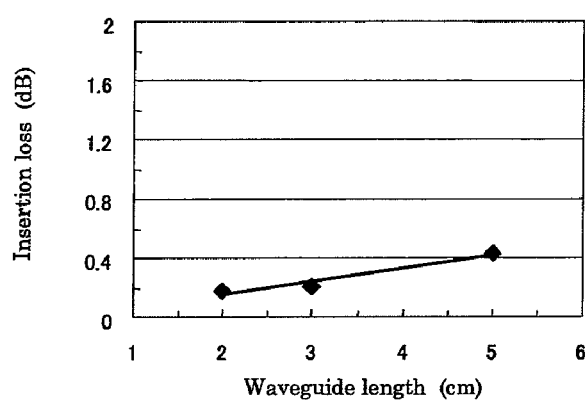
FIG. 5 is a view showing the results of measurement of transmission loss using a flexible optical waveguide produced in Example 1.

The thus obtained optical waveguide was subjected to 360° bending test, repeated bending test, film tensile test, reflow test, and measurements of thickness and transmission loss. As a result, it was confirmed that the obtained flexible optical waveguide exhibited a high flexing property, a good heat resistance, and a low transmission loss, i.e., a high transparency. The results are shown in Table 3 and FIGS. 3 to 5.

Example 2

The same procedure as in Example 1 was repeated except for using the cladding layer forming resin film D obtained in Production Example 4 in place of the cladding layer forming resin film A used as the lower cladding layer 4 and the upper cladding layer 3 in Example 1, changing the total amount of ultraviolet rays irradiated after laminating the upper cladding layer forming resin film from 25 J/cm$^2$ to 3 J/cm$^2$, and changing the heat-treating temperature from 160° C. to 120° C., thereby obtaining a flexible optical waveguide 1 as shown in FIG. 1(d) in which the cover film 5 was disposed outside of each of the upper and lower cladding layers.

Meanwhile, in the above optical waveguide, the cover film 5 was made of the PET film used as the support film of the cladding layer forming resin film D.

The thus obtained flexible optical waveguide was subjected to 360° bending test, repeated bending test, film tensile test, and measurements of thickness and transmission loss. As a result, it was confirmed that the obtained flexible optical waveguide exhibited a high flexing property, and a low transmission loss, i.e., a high transparency. The results are shown in Table 3.

Example 3

The cladding layer forming resin film E obtained in Production Example 5 was laminated on a silicon substrate having a 1 μm-thick oxide film (thickness: 625 μm), and the resultant laminate was irradiated with ultraviolet rays at 1 J/cm², and the PET film used as the support film was peeled off therefrom, thereby forming a lower cladding layer 4.

Successively, the core portion 2 was formed on the lower cladding layer by the same method and under the same conditions as used in Example 1, and further the cladding layer forming resin film E was laminated over the core portion 2 under the same conditions as used in Example 1, and the resultant laminate was irradiated with ultraviolet rays at 3 J/cm². After peeling off the PET film used as the support film of the cladding layer forming resin film E, the resultant laminate was heat-treated at 160° C. to form the upper cladding layer 3, thereby obtaining an optical waveguide with the silicon substrate.

Next, the thus obtained optical waveguide with the silicon substrate was dipped in a 5% by mass hydrofluoric acid aqueous solution over 24 h to peel off the optical waveguide from the silicon substrate, thereby obtaining a flexible optical waveguide 1 as shown in FIG. 1(a)

The thus obtained flexible optical waveguide was subjected to 3600 bending test, repeated bending test, film tensile test, reflow test, and measurements of thickness and transmission loss. As a result, it was confirmed that the obtained flexible optical waveguide exhibited a high flexing property, a good heat resistance and a low transmission loss, i.e., a high transparency. The results are shown in Table 3.

Example 4

The same procedure as in Example 1 was repeated except for using the core layer forming resin film C obtained in Production Example 3 in place of the core layer forming resin film B, thereby obtaining a flexible optical waveguide 1 as shown in FIG. 1(d) in which the cover film 5 was disposed outside of each of the upper and lower cladding layers.

Meanwhile, in the above optical waveguide, the cover film 5 was made of the polyamide film used as the support film of the cladding layer forming resin film A.

The thus obtained flexible optical waveguide was subjected to 360° bending test, repeated bending test, film tensile test, reflow test, and measurements of thickness and transmission loss. As a result, it was confirmed that the obtained flexible optical waveguide exhibited a high flexing property, a good heat resistance and a low transmission loss, i.e., a high transparency. The results are shown in Table 3.

Example 5

The same procedure as in Example 3 was repeated except for changing the core layer forming resin film used therein to the core layer forming resin film C obtained in Production Example 3, thereby obtaining a flexible optical waveguide 1 as shown in FIG. 1(a).

The thus obtained flexible optical waveguide was subjected to 360° bending test, repeated bending test, film tensile test, reflow test, and measurements of thickness and transmission loss. As a result, it was confirmed that the obtained flexible optical waveguide exhibited a high flexing property, a good heat resistance and a low transmission loss, i.e., a high transparency. The results are shown in Table 3.

Example 6

A quartz glass block-fitted optical fiber (GI-50/125 multi-mode fiber; NA: 0.20) was fixed to each end of the flexible optical waveguide having a waveguide length of 5 cm which was obtained in Example 1, using an optical adhesive, thereby producing an optical module. The insertion loss of the thus produced optical module was measured using a light source VCSEL "FLS-300-01-VCL" available from EXFO Corp., capable of emitting light having a central wavelength of 850 nm and a light receiving sensor "Q82214" available from Advantest Corp. As a result, it was confirmed that the insertion loss of the optical module was 0.5 dB or less. Also, the optical module was subjected to 360° bending test. As a result, it was confirmed that the increment of the insertion loss of the optical module when conducting the bending test at a radius of curvature of 2 mm was 0.1 dB or less. Further, the optical module was subjected to repeated bending test at a radius of curvature of 5 mm 100,000 times. As a result, it was confirmed that the increment of the insertion loss of the optical module after the repeated bending test was 0.1 dB or less. In addition, the optical module was subjected to repeated bending test at a radius of curvature of 2 mm 100,000 times, and then observed by a metallurgical microscope "BHMJL" available from Olympus Corp. As a result, it was confirmed that no cracks occurred in the core and cladding portions of the optical module.

TABLE 3

| Items | Examples | | | | |
|---|---|---|---|---|---|
| | 1 | 2 | 3 | 4 | 5 |
| Increment of insertion loss upon 360° bending test (dB)*¹ | <0.1 | <0.1 | <0.1 | <0.1 | <0.1 |
| Relative refractive index difference (%)*² | 2.2 | 2.2 | 2.2 | 2.3 | 2.3 |
| Increment of insertion loss after repeated bending test (dB)*³ | <0.05 | <0.05 | <0.05 | <0.05 | <0.05 |
| Occurrence of cracks after repeated bending test (core portion/ cladding portion)*⁴ | None/ none | None/ none | None/ none | None/ none | None/ none |
| Elastic modulus (GPa) | 4.1 | 3.2 | 1.7 | 4.0 | 1.8 |
| Maximum elongation (%) | 6 | 7 | 7 | 6 | 7 |
| Thickness (μm) | 145 | 155 | 120 | 145 | 120 |
| Increment of transmission loss after reflow test (dB/cm) | <0.02 | — | <0.02 | <0.02 | <0.02 |
| Transmission loss (dB/cm) | 0.1 | 0.1 | 0.1 | 0.1 | 0.1 |

Note
*¹Radius of curvature: 2 mm;
*²Wavelength: 830 nm;
*³Radius of curvature: 5 mm; after conducting the repeated bending test 100,000 times;
*⁴Radius of curvature: 2 mm; after conducting the repeated bending test 100,000 times.

INDUSTRIAL APPLICABILITY

The flexible optical waveguide and the optical module according to the present invention are excellent in flexing property, heat resistance and transparency and have a high flexibility for use, and are therefore usable in various extensive applications including general equipments such as cellular phones and note-type personal computers.

The invention claimed is:

1. A flexible optical waveguide comprising a core portion and a cladding layer, wherein an increment of insertion loss of the flexible optical waveguide upon subjecting the waveguide to a 360° bending test at a radius of curvature of 2 mm is 0.1 dB or less.

2. The flexible optical waveguide according to claim 1, wherein a relative refractive index difference between the core portion and the cladding layer is from 1 to 10%.

3. The flexible optical waveguide according to claim 1, wherein an increment of insertion loss of the flexible optical waveguide after subjecting the waveguide to a repeated bending test at a radius of curvature of 5 mm 100,000 times is 0.1 dB or less.

4. The flexible optical waveguide according to claim 1, wherein an elastic modulus of the flexible optical waveguide upon subjecting the waveguide to a film tensile test is from 0.05 to 6 GPa.

5. The flexible optical waveguide according to claim 1, wherein a maximum elongation of the flexible optical waveguide upon subjecting the waveguide to a film tensile test is from 3 to 50%.

6. The flexible optical waveguide according to claim 1, wherein a thickness of the flexible optical waveguide is from 9 to 500 μm.

7. The flexible optical waveguide according to claim 1, wherein an increment of transmission loss of the flexible optical waveguide after subjecting the waveguide to a reflow test at a maximum temperature of 265° C. three times is 0.05 dB/cm or less.

8. The flexible optical waveguide according to claim 1, wherein a transmission loss of the flexible optical waveguide is 0.3 dB/cm or less.

9. The flexible optical waveguide according to claim 1, wherein the core portion and/or the cladding layer are produced from a resin composition comprising (A) a binder polymer, (B) a photopolymerizable compound and (C) a photopolymerization initiator.

10. The flexible optical waveguide according to claim 9, wherein the core portion and/or the cladding layer are produced from the resin composition comprising the component (A) and the component (B) in amounts of from 5 to 80% by mass and from 20 to 95% by mass, respectively, on the basis of a total amount of the components (A) and (B), and further the component (C) in an amount of from 0.1 to 10 parts by mass on the basis of 100 parts by mass of the total amount of the components (A) and (B).

11. The flexible optical waveguide according to claim 9, wherein the binder polymer (A) is a phenoxy resin.

12. The flexible optical waveguide according to claim 9, wherein the photopolymerizable compound (B) includes a compound having an ethylenically unsaturated group in a molecule thereof.

13. The flexible optical waveguide according to claim 9, wherein the photopolymerizable compound (B) includes a monofunctional (meth)acrylate having at least one group selected from the group consisting of an aryl group, an aralkyl group, an aryloxy group and an aromatic heterocyclic group.

14. The flexible optical waveguide according to claim 9, wherein the photopolymerizable compound (B) includes an ethoxylated fluorene-type di(meth)acrylate represented by the following general formula (1):

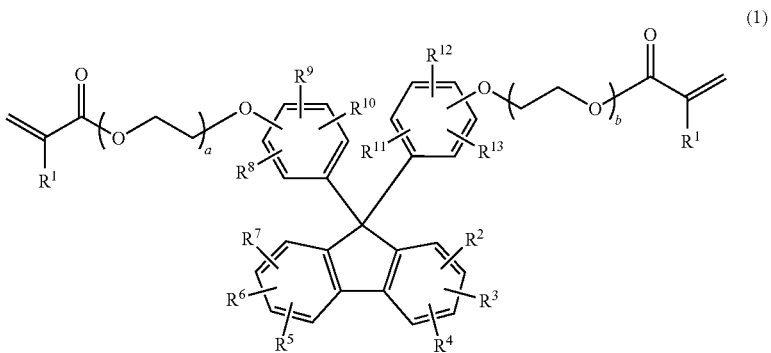

wherein $R_1$ is a hydrogen atom or a methyl group; $R_2$ to $R_{13}$ are each independently a hydrogen atom, an alkyl group having 1 to 12 carbon atoms, an alkoxy group having 1 to 6 carbon atoms, an alkoxycarbonyl group having 2 to 7 carbon atoms, an aryl group having 6 to 10 carbon atoms or an aralkyl group having 7 to 9 carbon atoms; and a and b are each independently an integer of 1 to 20.

15. The flexible optical waveguide according to claim 9, wherein the photopolymerizable compound (B) includes a (meth)acrylate represented by the following general formula (2):

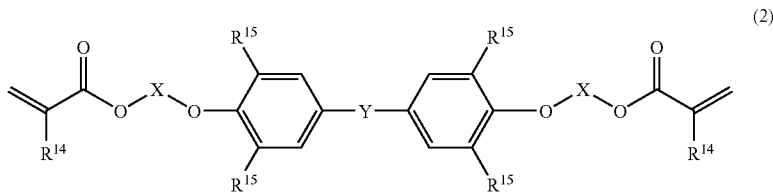 (2)

wherein X is $CH_2CH(OH)CH_2$, $(C_2H_4O)_cC_2H_4$, $(C_3H_6O)_dC_3H_6$ or $(C_2H_4O)_e(C_3H_6O)_fC_3H_6$; Y is $C(CH_3)_2$, $CH_2$, $SO_2$ or O; c, d, e and f are respectively an integer of 0 to 10; $R^{14}$ is a hydrogen atom or a methyl group; and $R^{15}$ is a hydrogen atom, a methyl group or a halogen atom.

16. The flexible optical waveguide according to claim 9, wherein the photopolymerizable compound (B) includes a compound having two or more epoxy groups in a molecule thereof.

17. An optical module using the flexible optical waveguide as defined in claim 1.

18. An optical module using the flexible optical waveguide as defined in claim 9.

* * * * *